D. J. HAVENSTRITE.
PROCESS FOR MAKING AND HARVESTING PLATE ICE.
APPLICATION FILED DEC. 11, 1907.

911,238.

Patented Feb. 2, 1909.

3 SHEETS—SHEET 1.

WITNESSES:

INVENTOR
David J. Havenstrite
BY
ATTORNEY

D. J. HAVENSTRITE.
PROCESS FOR MAKING AND HARVESTING PLATE ICE.
APPLICATION FILED DEC. 11, 1907.

911,238.

Patented Feb. 2, 1909.
3 SHEETS—SHEET 2.

WITNESSES:

INVENTOR

BY

ATTORNEY

D. J. HAVENSTRITE.
PROCESS FOR MAKING AND HARVESTING PLATE ICE.
APPLICATION FILED DEC. 11, 1907.
911,238.
Patented Feb. 2, 1909.
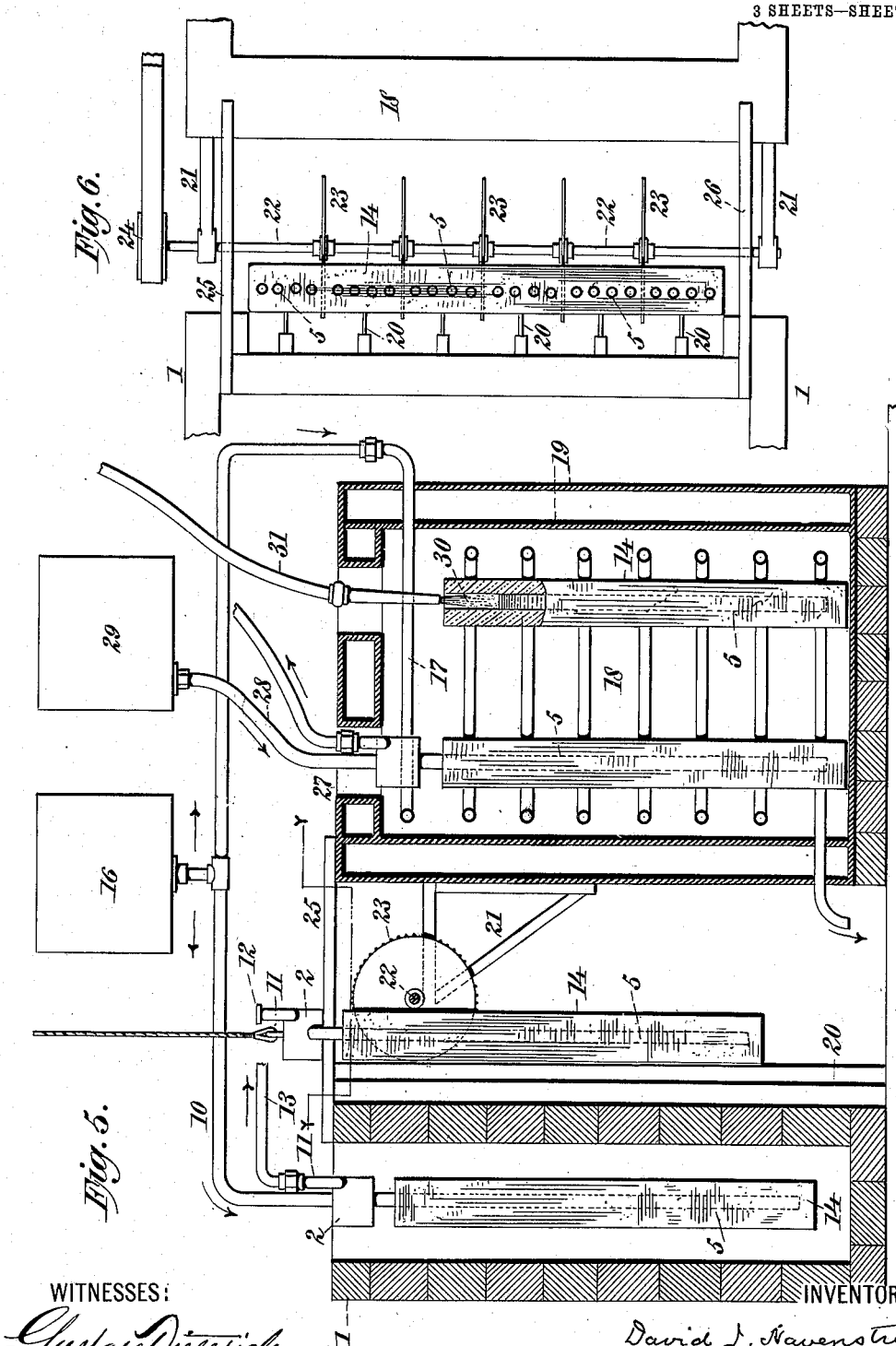

UNITED STATES PATENT OFFICE.

DAVID J. HAVENSTRITE, OF NEWARK, NEW JERSEY, ASSIGNOR TO CENTERFREZE ICE PROCESS COMPANY, A CORPORATION OF ARIZONA TERRITORY.

PROCESS FOR MAKING AND HARVESTING PLATE-ICE.

No. 911,238.   Specification of Letters Patent.   Patented Feb. 2, 1909.

Application filed December 11, 1907. Serial No. 406,106.

*To all whom it may concern:*

Be it known that I, DAVID J. HAVENSTRITE, a citizen of the United States, residing at Newark, in the county of Essex and State of New Jersey, have invented a certain new and useful Improvement in Processes for Making and Harvesting Plate-Ice, of which the following is a specification.

The invention is a process for the manufacture and harvesting of plate ice and consists in freezing water from a plurality of refrigerating foci and arresting said freezing operation before the resulting ice cake meets the inner surfaces of the vessel containing said water: the invention also includes further steps in said process as more particularly recited in the claims.

In U. S. Letters Patent No. 842,147, granted to me January 22, 1907, I have described and claimed one form of apparatus wherein my aforesaid process may be carried into effect.

Figure 1:
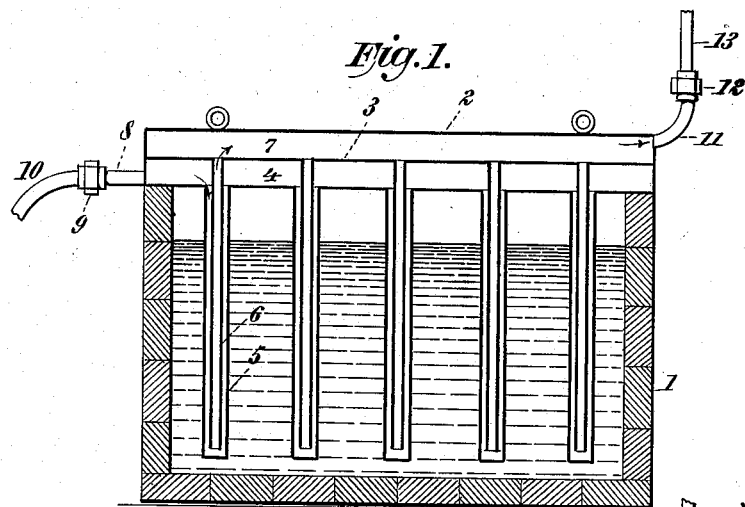
Figure 2:
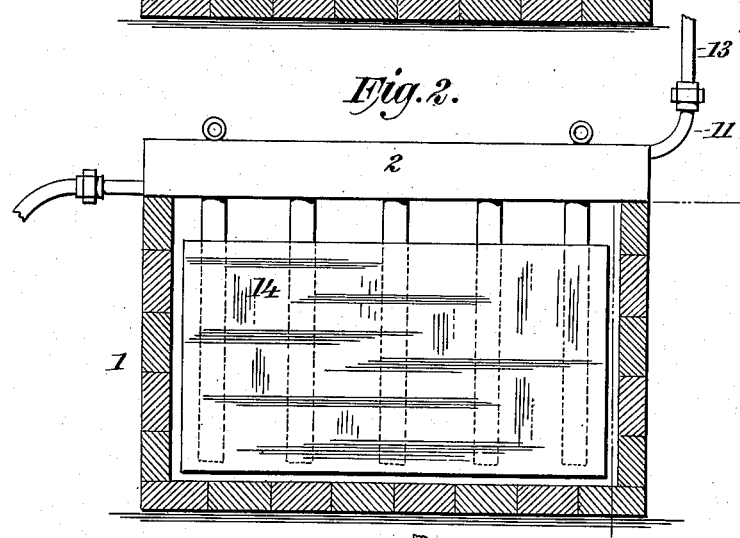
Figure 3:
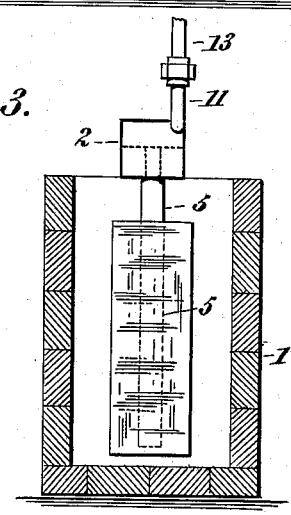
Figure 4:
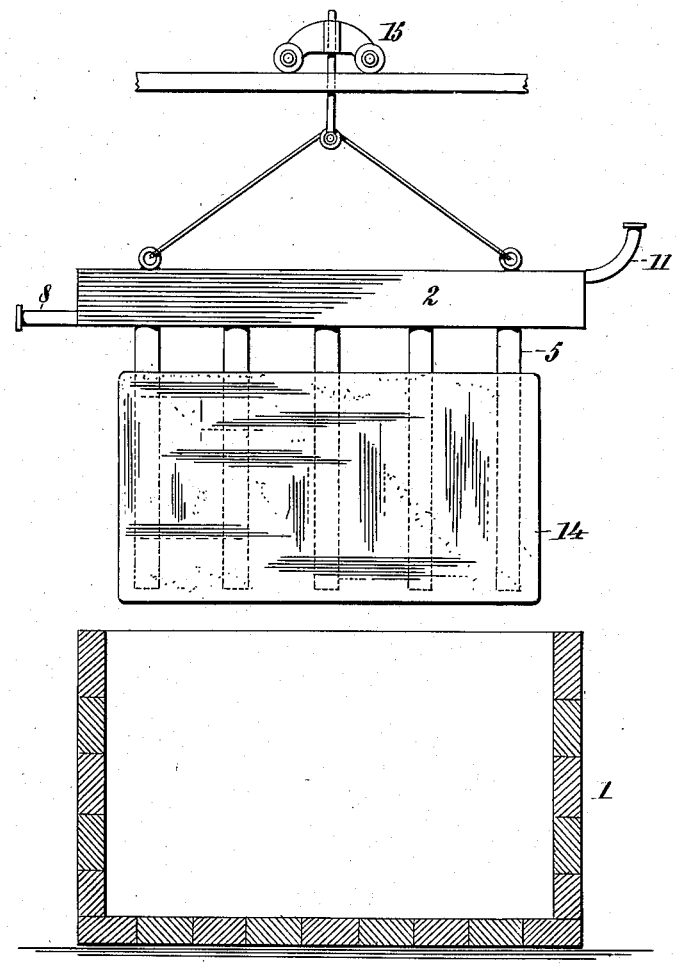

In the accompanying drawings—Figure 1 is a cross section of a tank, showing the freezing tubes in place. Fig. 2 is the same, showing the ice plate formed on and adhering to the tubes with its bounding surfaces free from the bottom and ends of the tank. Fig. 3 is a section on the line *x x* of Fig. 2, showing the ice plate as before, and free from the bottom and sides of the tank. Fig. 4 is a cross section showing the tubes and ice plate formed thereon and adhering thereto, lifted from the tank. Fig. 5 is a cross section showing the tank and ice plate thereon, the dividing saws and the refrigerating chamber, in which chamber are two ice plates, one of which is being thawed off from the tubes and the other (partly in section) from which the tubes have been removed is receiving water in the openings left by said tubes. Fig. 6 is a plan view and partial section on the line *y y* of Fig. 5, of the saws and ice plate being divided thereby.

Similar numbers of reference indicate like parts.

The water to be frozen is contained in a tank 1. Resting on the walls of said tank is a header 2, having a longitudinal partition 3. Extending downwardly from the header 1 and communicating with the compartment 4 thereof below partition 3 are a plurality of tubes 5 closed at the lower ends. Within each tube 5 is a smaller tube 6, which is secured in the partition 3, and communicates with the compartment 7 above partition 3. The tubes 6 are open at both ends. To the lower compartment 4 connects a pipe 8 detachably secured by any suitable coupling 9 to a pipe 10 leading from any source of refrigerating fluid. To the upper compartment 7 connects a pipe 11, detachably secured by any suitable coupling 12 to a delivery pipe 13.

The tubes 5 extend downward into the water to be frozen, and have their immersed peripheries and ends distant from the inner surfaces of the tank. The refrigerating fluid entering the header by pipe 8 passes down through the tubes 5 and up by tubes 6, and escapes by pipe 11. The circulation of the refrigerating fluid is continued until an ice plate 14, Figs. 2, 3 and 4, is formed between the tubes 5 and around their immersed peripheries and closed ends, which plate has its bounding surfaces free from the inner surfaces of said tank. That is to say, the ice plate is not to be permitted to adhere to the sides or bottom of the tank, but is to be separate therefrom, so that together with the tubes 5 it can be lifted readily out of the tank as shown in Fig. 4. To this end the pipes 8 and 9 and 11 and 13 are previously uncoupled and the header 2 with its depending tubes and the ice plate now frozen upon, and attached to said tubes is raised from the tank by any suitable hoisting means, such as a traveling crane 15.

The ice plate may now be separated from the tubes 5 in any suitable way; preferably by thawing which is easily accomplished by connecting a pipe leading from any source of warm fluid to the pipe 8, and thus causing said fluid to circulate through the tubes. As soon as the ice plate and tubes are separated, said plate may be divided into smaller plates.

Where the ice plate after removal from the tank has to be transported to a distance therefrom prior to thawing off, the tubes remaining therein act as reinforcements and prevent any breakage of the plate during transit. This is a feature of special advantage since large ice plates when transported in the usual tongs frequently become ruptured and the pieces falling are apt to do injury.

In the arrangement of apparatus shown in Figs. 5 and 6, the source of refrigerating fluid indicated at 16, supplies by pipe 10 the header 2, and tubes in the tank 1, and also by pipe a fixed refrigerating coil 17, which is disposed inside the box 18, which is heat insulated by double walls 19 with air spaces between, or in any other suitable way. On the outer side of the wall of tank 1, are disposed a number of separate bars 20, and supported in brackets 21 on the facing wall of the box 18 is a shaft 22, carrying a number of circular saws 23, and driven by pulley and belt 24. Bars 25, 26, extend between tank 1 and box 18. After the tubes and ice plate have been lifted out of the tank, as shown in Fig. 4, said plate may be carried by means of the traveling crane over the space between tank 1 and box 18, and then gradually lowered into said space with one side resting against the bars 20 and upon the saws 23, which operate, as shown in Fig. 6, in planes lying between the tubes 5, thus dividing said plate into a plurality of smaller plates, all, however, remaining attached to said tubes.

The divided plate may then again be lifted and transported over an opening 27 in the cover of box 18, and lowered through said opening into said box, as shown in Fig. 6. The pipe 28 conveying heating fluid from any suitable source, indicated at 29, is then connected to the header and caused to circulate through the tubes, thus separating the divided plates from said tubes, so that the header and tubes being again lifted may be withdrawn from said plates, leaving them in the refrigerating box 18. The openings 30 left in the plates may now be filled with water from a hose 31 leading from any source of supply, and the box being closed said water freezes, thus rendering the ice plates solid.

Instead of conveying the ice plate from the tank to the dividing saws it may be taken bodily to the refrigerating box, and without division, thawed off and its openings filled with water in the manner already described.

The term "foci" has been used in this specification to indicate that the heat absorption by which the ice is formed takes place at a multiplicity of centers within the boundaries of the plate. These foci or centers of refrigeration are shown as cylindrical pipes, but obviously they need not be circular in cross section. Any long, hollow, pipe-like structure of relatively small diameter, will serve as a "focus" of heat absorbing influence, the cake being formed by the gradual and progressive formation of ice on all sides of each "focus" and the coalescence of the so formed cylindrical ice masses.

I claim:—

1. The process of making plate ice which consists in freezing water outwardly in all directions from a multiplicity of heat absorbing foci arranged within the limits of the cake to be formed and arresting said freezing operation before the resulting ice cake meets the inner surfaces of the vessel containing said water.

2. The process of making plate ice which consists in suspending in water a multiplicity of parallel pipes, continuously supplying thereto a refrigerating agent, causing ice to form regularly and progressively therefrom until, by the coalescence of the so-formed annular ice cakes, a continuous plate of the desired thickness is formed, removing the thus formed plate, while still retaining the pipes, from the water, and separating the ice cake from the pipes.

In testimony whereof I have affixed my signature in presence of two witnesses.

DAVID J. HAVENSTRITE.

Witnesses:
GERTRUDE T. PORTER,
PARK BENJAMIN, Jr.